United States Patent Office 3,625,020
Patented Dec. 7, 1971

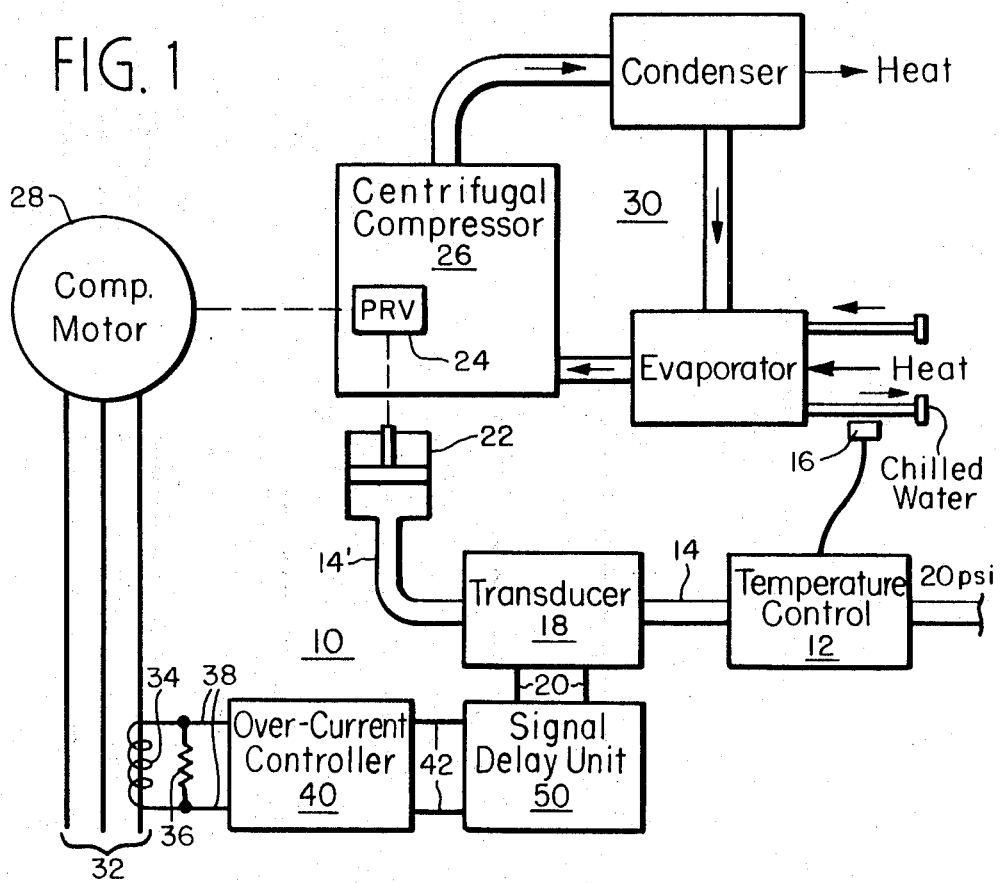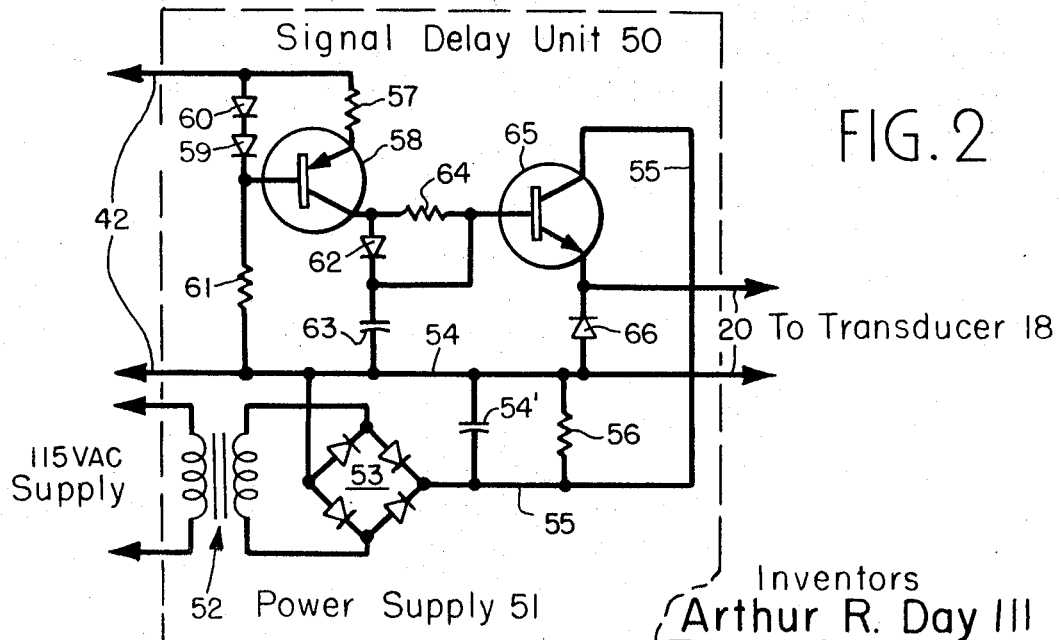

3,625,020
ELECTRONIC CONTROL FOR CENTRIFUGAL CHILLER WITH PNEUMATIC CONTROLS
Frank A. Kimpel, York, Arthur R. Day III, Camp Hill, and Joseph E. Fleckenstein, Red Lion, Pa., assignors to Borg-Warner Corporation, Chicago, Ill.
Filed June 30, 1970, Ser. No. 51,083
Int. Cl. F25b 41/04
U.S. Cl. 62—158                                              4 Claims

ABSTRACT OF THE DISCLOSURE

An improvement in the controls for pneumatic controlled centrifugal compressor-chillers of refrigeration systems is disclosed wherein a restrictor in a pneumatic line may be eliminated and a delay unit coupled between an electric motor current controller and a transducer, which transducer alters the pressure in the pneumatic line to change the throttling of the compressor input. The delay unit expands, linearly, the time period of changes in electrical current signal. It also provides different rates of time expansion for positive and negative changes in its input.

FIELD OF THE INVENTION

The present invention is directed toward an improvement in the control system of centrifugal compressor-chillers of the type commonly employed in large capacity refrigeration systems such as those used to air condition large structures. More particularly, the present invention is directed toward an improvement for such a chiller of the type that employs pneumatic circuits as its primary control mechanism.

BACKGROUND OF THE INVENTION

Many commercially produced large capacity air-conditioning systems employ centrifugal chillers having pneumatic controls. Such a system is, for example, illustrated in U.S. Pat. No. 2,817,213 which was issued on Dec. 29, 1957 and is entitled "Refrigeration Apparatus With Load Limit Control." In such systems a temperature sensing and controlling device generates a pneumatic signal representative of the chilled water (or other fluid) output of the refrigeration system. This pneumatic signal is coupled to a transducer which is also responsive to an electrical signal representative of the current drawn by the compressor motor. The output of the transducer is a pneumatic signal that controls a throttling device, such as pre-rotation vanes, at the refrigerant input to the compressor.

During normal operation the compressor motor is fully electrically energized and output temperature is controlled by the pneumatic signal from the temperature controller, via the transducer, to the pre-rotation vanes (PRV) or other throttling device. By changing the position of the throttling device the gas flow of the refrigeration cycle is changed and thus its output is changed. The transducer serves to override the pneumatic control signal of the temperature controller in response to a sensed large current drawn by the compressor motor to lessen the load thereon by changing the position of the throttling device.

It is also known that, to prevent excessive "hunting" or too rapid cycling of the control system, a restrictor may be, and in commercial systems, often is inserted into the pneumatic control line between the transducer and the throttling device. This restrictor serves to delay the transmittal of rapid rises and falls in pressure from the transducer to the throttling device.

The above described prior art systems have and do function in a generally acceptable manner. However, it has been found that under some circumstances the closing of the PRV, or the like, is excessively delayed and also that the control's function is subject to adverse change in its operational setting during periods of use. These disadvantages, the present inventors have discovered, are due to the collection of minute matter in the small openings of the restrictor. This causes the partial clogging of the restrictor and also results in undesirable setting changes through the physical vibration of the restrictor that may occur in any normal operating environment.

SUMMARY OF THE INVENTION

To overcome the above-mentioned drawback in the control of a centrifugal chiller in refrigeration systems, the present invention provides an improvement in the above described control system, wherein the restrictor may be eliminated from the pneumatic line, which improvement comprises an electronic signal delay unit preferably of the integrating capacitance-resistance type connected to the current signal source and the transducer for delaying the activation and de-activation of the transducer in response to the current signal.

This improved system allows for quicker response to sensed chiller temperature changes, and allows for more stable operation due to the elimination of the pneumatic restrictor. In addition, the response to increases and decreases in signals may be made different while the response of the restrictor is essentially fixed to one value for both conditions. Also the response may, in accordance with a secondary feature of the present invention, be made linear with time.

BRIEF DESCRIPTION OF THE DRAWINGS

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements, and in which:

FIG. 1 is a schematic diagram, partly in block form, of a control system incorporating the present invention; and FIG. 2 is a circuit diagram of a major component part of the system of FIG. 1.

DETAILED DESCRIPTION

Referring to the drawings, and especially to FIG. 1 thereof, a control system constructed in accordance with the present invention is depicted. The system is generally designated by the numeral 10 and includes a temperature control unit 12 which develops a pneumatic control signal in a pneumatic line 14 in response to the chilled water temperature sensed by a temperature sensor 16. A suitable temperature control unit 12 is the commercially available T8000 model manufactured by the Johnson Service Company of Milwaukee, Wis. This particular unit produces an output of from 0 to 20 pounds per square inch (p.s.i.).

The pneumatic line 14 is connected through a transducer 18 which functions to connect the pneumatic line 14 with a second section of pneumatic line 14' and to alter the pressure received from the line 14 and delivered to the line 14' in response to an electrical current received via the electrical lines 20.

A suitable transducer for the unit 18 is the commercially available N6800 "Electro-Pneumatic Transducer" manufactured by the Johnson Service Company and described in their Apparatus Bulletin N–6800.

The pneumatic line 14' is connected to means for control of throttling such as the cylinder 22 which controls means 24 such as PRV for throttling the input to a centrifugal compressor 26. The compressor is part of a refrigeration system 30 such as the system described in the aforementioned Pat. 2,817,213.

The compressor 26 is driven by an electric motor 28 which may be of the three-phase type and which derives its electrical power via input leads 32 which are connected to any conventional power source.

The current drawn by the motor 28 is sampled in at least one of its input leads 32 by means of a current coupling transformer 34. A small resistor 36 is connected across the secondary coil of the transformer 34 to develop an appropriate voltage signal between a pair of output lines 38. These lines 38 couple this voltage signal, which is proportional to the current drawn by the motor 28, to an appropriate over-current signal generator 40 which produces an appropriate electrical signal in its output lines 42.

The transformer 34 is preferably a toroidal current transformer which may simply be slipped about a lead 32. A satisfactory unit 40 is the commercially available LLC–3000 "Load Limiting Controller" manufactured by the Johnson Service Company and described in their Apparatus Bulletin LLC–3000.

In accordance with the present invention, an electrical delay unit 50 is provided to receive the output via the line 42 from the over-current signal generator 40 and has an output connected to the input lines 20 of the transducer 18. The delay unit 50 serves to delay the transfer of the full effect of output signal changes on the line 42 for a short period to prevent excessive cycling of the system 10.

Referring now to FIG. 2 the delay unit 50 is there depicted in greater detail and can be seen to include an independent power supply 51 which includes a transformer 52 coupled to a full wave four diode bridge rectifier 53 whose negative output line is connected to a line 54 which may be taken as a reference potential line. The line 54 is connected to the negative input terminal of the lines 42 and also to the similar output terminal of the lines 20. The positive output of the rectifier 53 is connected to a B+ line 55. The line 55 is connected through the smoothing circuit, including a capacitor 54' and resistor 56, to the reference voltage line 54.

Although here described for definiteness with a separate power supply 51, any equivalent source of B+ voltage may be employed.

The positive line 42 is connected through a resistor 57 to the emitter of an PNP transistor 58. The base of the transistor 58 is connected to the cathode of a diode 59 whose anode is connected to the cathode of a second diode 60 whose anode is, in turn, connected to the more positive of signal lines 42. The base of the transistor 58 is also connected to reference line 54 via a bias establishing resistor 61.

The collector of the transistor 58 is connected through the anode-cathode circuit of a third diode 62 to one side of a capacitor 63, whose other side is connected to the reference line 54. The collector of the transistor 58 is connected to one end of a resistor 64 whose other end is connected to the junction between the diode 62 and the capacitor 63 and also to the base of an NPN transistor 65.

The collector of the transistor 65 is connected to the B+ line 55 and its emitter is connected through the cathode-anode circuit of a fourth diode 66 to the line 54 and also to the other output line 20.

In operation, the circuit of FIG. 2 serves as a constant current source coupled to charge a capacitor which has an emitter follower connected across it for driving the transducer unit 18. More specifically, the diodes 59 and 60, the transistor 58 and the resistors 57 and 61 comprise a constant current source which charges the capacitor 63 through the diode 62 and the resistor 64. The transistor 65 functions as an emitter follower to avoid loading the capacitor 63 and provides a low output impedance for driving the transducer 18. The diode 66 suppresses any transient voltage spikes which may result from turning the inductive transducer 18 on and off. When the compressor 26 is started the output of the controller unit 40 will be low, e.g. at 0 (zero) volt DC, as the starting (inrush) current of the motor will produce a voltage signal in excess of the set point of the controller 40. At this time the voltage across capacitor 63 is zero and thus no voltage is applied to the transducer via emitter follower including the transistor 65. Since no voltage is applied to the transducer 18, it fully restricts the flow of air through it and the pre-rotation vanes remain closed. This is a desirable feature as it prevents the compressor from loading the compressor motor before the motor 28 is up to speed.

As the motor speed increases, the motor current decreases and the controller output voltage begins to rise. When the voltage reaches an intermediate level in its range, e.g. about a 4-volt level, a sufficient bias is present for the constant current source including the transistor 58 to become operative. At this time the voltage across the emitter resistor 57 of the transistor 58 is a relatively constant value, e.g. about 0.8 volt. Hence, the emitter current of the transistor 58 is nearly constant and is equal to the ratio of the constant voltage (0.8) to the resistance of the resistor 57. Since the collector current is approximately equal to the emitter current, the transistor 58 functions as a constant current source. The current flows from the collector of the transistor 58, through the parallel current path consisting of the diode 62 and the resistor 64 and charges the capacitor 63. The constant current charges the capacitor 63 at a constant rate thus causing the voltage across the capacitor to increase linearly with time:

$$\frac{dv}{dt} = \frac{I}{C} = \text{Constant}$$

Therefore:

$$V = \frac{I}{C} t$$

Where I is the current in amperes from the transistor 58, C the capacitance in farads of the capacitor 63, V the voltage in volts across the capacitor 63 and $t$ is time in seconds.

The emitter follower circuit utilizing the transistor 65 "follows" the voltage rise on the capacitor 63 and applies this voltage (lowered by the base-emitter voltage of the transistor 65) to the transducer 18. The applied voltage causes the transducer 18 to operate and permit an increasing amount of air to flow through it into the pneumatic line 14'. It should be noted that the transistor 65 is chosen to have a high current gain (beta) to avoid drawing appreciable current from the current source.

When the output of the controller 40 (FIG. 1) reaches a maximum, the capacitor 63 (FIG. 2) will continue to charge until it reaches a voltage level at which insufficient bias voltage exists across the collector-emitter of the transistor 58 to permit it to function. At this time, the output voltage of the emitter follower including the transistor 65 will be at its highest level and the transducer 18 will allow maximum air flow through it. As long as the controller signal continues at the same level, the output of the unit 50 and hence, the position of the transducer 18 will remain fixed.

If the controller signal level increases, the current source will again operate to linearly increase the output signal from the delay unit. If the controller signal level decreases (as may be caused by an overcurrent situation of the compressor motor) this will cause the collector-base junction of the transistor 58 to become forward biased and start conducting heavily. The diode 62 prevents the conduction of the transistor 58 from rapidly discharging the capacitor 63. The resistor 64 provides an alternate current path for the controlled discharge of the capacitor 63. Under these conditions, the rate of discharge of capacitor 63 is essentially determined by the time constant T of the resistor 64 and capacitor 63 or:

$$T = R \times C$$

where R is the resistance in ohms of the resistor 64.

It should be noted that a feature of this circuit is that it provides independently adjustable charging and discharging times, i.e., the resistor 51 in the current source adjusts the charging rate and the resistor 64 controls the rate at which capacitor 63 discharges. This is desirable as it permits a long delay before loading when the motor is first starting and a rapid response to unload the compressor when an overload occurs.

For completeness in the disclosure of the above described system but not for purposes of limitation the following representative values and component identifications are submitted. These values and components were employed in a system that was constructed and tested and which provided high quality performance. Those skilled in this art will recognize that many alternative elements and values may be employed in constructing systems and circuits in accordance with the present invention. Indeed, even though the herein set out system and circuit are the presently considered best mode of practicing the invention, the present inventors may themselves decide, after further experiments and experience or for differing environments of use, to make modifications and changes from the herein set out values.

| Circuit element: | Type or value |
|---|---|
| Electrolytic capacitor 63 | 2500 mf., 15 v. |
| Electrolytic capacitor 54 | 75 mf., 50 v. |
| Diodes 59, 60, 62, 66 | 1N914 (General Electric). |
| Diode bridge 53 | 10 DB1P (International Rectifier). |
| Transistor 58 | 2N5355. |
| Transistor 65 | 2N4517. |
| Carbon resistor 61 | 750 ohms, ½ w. |
| Carbon resistor 57 | 2.0K ohms, ½ w. |
| Carbon resistor 64 | 62K ohms, ½ w. |
| Carbon resistor 56 | 5.6K ohms, ½ w. |
| Power transformer 52 | PC–20–60. |

While efforts have been made to accurately record and transcribe the above set out values it is of course, possible that one or more errors may have inadvertently crept into this compilation. To guard against these, the reader is cautioned to employ the well-known methods to mathematically and experimentally verify the above.

Three prototype controls were built using these circuit values and the circuit shown in FIG. 2. These were tested in laboratory environments and performed satisfactory. Using the component values given the "on" (charging) time was approximately two minutes and the "off" (discharging) time was about one minute. Additionally, one prototype unit was installed on a production chiller and the entire system of FIG. 1 was tested. The restrictor performed satisfactorily and stabilized the operation of the chiller.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a control system for electric motor driven refrigeration centrifugal compressor-chiller of the type employing a pneumatic line to control the position of a throttling device at the input to the compressor and including transducer means for altering the signal on the pneumatic line in response to an electrical signal related to the electric motor current, the improvement comprising:
   an electrical signal delay unit (50) coupled between the current electrical signal source and the transducer for delaying the activation of the transducer in response to the electrical signal.

2. The improvement in a control system for electric motor driven refrigeration centrifugal compressor-chiller of the type employing a pneumatic line to control the position of a throttling device at the input to the compressor and including a transducer means for altering the signal on the pneumatic line in response to an electrical signal related to the motor current, as defined in claim 1, wherein:
   said electrical signal delay unit comprises means for effecting the change of its output in response to a change in a parameter in its input from the current electrical signal source, in a linear manner over the delay period.

3. The improvement in a control system for electric motor driven refrigeration centrifugal compressor-chiller of the type employing a pneumatic line to control the position of a throttling device at the input to the compressor and including transducer means for altering the signal on the pneumatic line in response to an electrical signal related to the motor current, as defined in claim 2, wherein:
   the delay rates of said delay unit are different for a change in its input in one direction of change than in the opposite direction of change; and
   said delay unit includes:
      a constant current source (58), responsive to the delay units input signal and
      a resistive-capacitance circuit (64, 63) coupled to said constant current source and to the output of the delay unit.

4. The improvement in a control system for electric motor driven refrigeration centrifugal compressor chiller of the type employing a pneumatic line to control the position of a throttling device at the input to the compressor and including transducer means for altering the signal on the pneumatic line in response to an electrical signal related to the motor current, as defined in claim 1, wherein:
   the delay rates of said delay unit are different for a change in its input in one direction of change than in the opposite direction of change.

References Cited

UNITED STATES PATENTS

| 3,204,423 | 9/1965 | Resh | 62—217 |
| 3,380,262 | 4/1968 | Miner | 62—217 |

MEYER PERLIN, Primary Examiner

U.S. Cl. X.R.

62—217

UNITED STATES PATENT OFFICE
CERTIFICATE OF CORRECTION

Patent No. 3,625,020          Dated December 7, 1971

Inventor(s) Frank A. Kimpel et al

It is certified that error appears in the above-identified patent and that said Letters Patent are hereby corrected as shown below:

Column 5, line 38, "2N4517" should read -- 2N3417 --.

Signed and sealed this 17th day of October 1972.

(SEAL)
Attest:

EDWARD M. FLETCHER, JR.                ROBERT GOTTSCHALK
Attesting Officer                      Commissioner of Patents